United States Patent
Walsh et al.

(10) Patent No.: US 9,312,765 B2
(45) Date of Patent: Apr. 12, 2016

(54) SWITCH MODE POWER SUPPLY INCLUDING BINARY PULSE SKIPPING

(71) Applicant: QUALCOMM Incorporated, San Diego, CA (US)

(72) Inventors: Gregory Walsh, Isleworth (GB); Zoran Janosevic, Reading (GB); Mathieu Jaloux, Farnborough (GB); Hardik M Patel, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 266 days.

(21) Appl. No.: 14/179,218

(22) Filed: Feb. 12, 2014

(65) Prior Publication Data

US 2015/0229211 A1    Aug. 13, 2015

(51) Int. Cl.
| | | |
|---|---|---|
| H02M 3/157 | (2006.01) | |
| H02M 1/088 | (2006.01) | |
| H02M 1/44  | (2007.01) | |
| H02M 3/156 | (2006.01) | |
| H02M 1/00  | (2007.01) | |

(52) U.S. Cl.
CPC .............. *H02M 3/157* (2013.01); *H02M 1/088* (2013.01); *H02M 1/44* (2013.01); *H02M 3/156* (2013.01); *H02M 2001/0032* (2013.01); *H02M 2001/0041* (2013.01)

(58) Field of Classification Search
CPC .................................................... H02M 3/157
USPC ......................................... 323/283, 284, 288
See application file for complete search history.

(56) References Cited

U.S. PATENT DOCUMENTS

| | | | | |
|---|---|---|---|---|
| 7,876,080 | B2* | 1/2011 | Dwarakanath | H02M 1/36 323/284 |
| 2003/0201758 | A1 | 10/2003 | Chen | |
| 2004/0037094 | A1* | 2/2004 | Muegge | H02M 3/156 363/21.16 |
| 2004/0095020 | A1* | 5/2004 | Kernahan | H02M 3/157 307/35 |
| 2005/0116698 | A1* | 6/2005 | Prinz | H02M 3/157 323/283 |
| 2006/0250120 | A1* | 11/2006 | King | H02M 3/157 323/283 |
| 2009/0115391 | A1* | 5/2009 | Chuang | H03K 3/72 323/283 |

(Continued)

OTHER PUBLICATIONS

International Search Report and Written Opinion—PCT/US2015/015645—ISA/EPO—Apr. 30, 2015.

*Primary Examiner* — Jeffrey Sterrett
(74) *Attorney, Agent, or Firm* — Fountainhead Law Group P.C.

(57) ABSTRACT

In one embodiment, a circuit comprises a sense circuit configured to sense an increase in an output voltage of a switching regulator under a light load condition. A pulse generating circuit generates a control signal to switch on and off a voltage input to the switching regulator. The pulse generating circuit reduces in a binary manner a switching frequency of the control signal under the light load condition as the sensed output voltage increases. As the output voltage rises, a clock signal is divided by two to remove every second pulse and applied to the pulse generating circuit. Further increases in the output voltage cause divisions of the clock frequency by four to remove 3 of 4 pulses so that only every fourth pulse remains. With output voltage increases, the frequency is divided by eight to remove 7 of 8 pulses so that every eighth pulse remains, and so forth.

17 Claims, 4 Drawing Sheets

(56) References Cited

U.S. PATENT DOCUMENTS

| | | |
|---|---|---|
| 2009/0174440 A1 | 7/2009 | Man et al. |
| 2011/0006853 A1 | 1/2011 | Mohtashemi et al. |
| 2012/0014148 A1 | 1/2012 | Li et al. |
| 2012/0134182 A1 | 5/2012 | Zhu et al. |
| 2012/0223691 A1* | 9/2012 | Weinstein ............... H02M 1/44 323/283 |
| 2013/0127430 A1 | 5/2013 | Leung |
| 2013/0241512 A1 | 9/2013 | Yamada |
| 2013/0257358 A1 | 10/2013 | Hussain et al. |
| 2014/0117955 A1* | 5/2014 | Zoso .................... H02M 3/157 323/271 |
| 2014/0253080 A1* | 9/2014 | Jiang ........................ G05F 1/62 323/284 |
| 2015/0229211 A1* | 8/2015 | Walsh .................... H02M 1/44 323/283 |

\* cited by examiner

SWITCH MODE POWER SUPPLY INCLUDING BINARY PULSE SKIPPING

BACKGROUND

The disclosure relates to switch mode power supplies including binary pulse skipping.

Unless otherwise indicated herein, the approaches described in this section are not admitted to be prior art by inclusion in this section.

Switching regulators are noisy. The effect can be minimized provided the switching frequency harmonics do not fall into pass bands of radio frequency (RF) receiver. A switching regulator operates by storing energy in an inductor during a power on (Pon) time, then transferring that energy to a load during an off time. There is a minimum requirement for the Pon time, in order to avoid incorrect triggering of internal comparators of the switching regulator.

Because the Pon(min) is fixed, there is a minimum amount of energy stored for each Pon pulse. For regulation, the energy must be dissipated in the load. With light loading on the switching regulator, the energy dissipation may not happen.

There are two existing approaches for handling this potential loss of regulation, namely, pulse frequency modulation (PFM), and pulse skipping in pulse width modulation (PWM) mode. PFM is asynchronous and therefore has an unknown and uncontrolled harmonic spectrum.

Pulse skipping removes pulses from the switching waveform. However, the number of pulses skipped is load dependent and effectively random. Even if predictable, e.g., the removal of two pulses in every three, the effect is that the harmonic spectrum has changed, as the fundamental is now one third of the original, and has harmonics in new positions.

SUMMARY

The present disclosure describes switch mode power supplies including binary pulse skipping. In one embodiment, a circuit comprises a sense circuit configured to sense an increase in an output voltage of a switching regulator under a light load condition. A pulse generating circuit generates a control signal to switch on and off a voltage input to the switching regulator. The pulse generating circuit reduces in a binary manner a switching frequency of the control signal under the light load condition as the sensed output voltage increases.

In one embodiment, the pulse generating circuit comprises a clock signal generator coupled to the sense circuit to generate a clock signal based on the sensed increase in the output voltage. A pulse generator is coupled to the clock signal generator to generate the control signal based on the clock signal.

In one embodiment, the clock signal generator comprises a frequency divider to divide a frequency of the clock signal by two in response to the sensed increase in the output voltage being above a threshold.

In one embodiment, the frequency of the pulse signal is reduced in a binary manner corresponding to powers of two that are related to the amount by which the increased output voltage exceeds the threshold values.

In one embodiment, the sense circuit comprises an analog-to-digital converter coupled to receive the output voltage of the switching regulator and to generate a digital signal based on the sensed increase in the output voltage. The pulse generating circuit comprises a clock generator coupled to the analog-to-digital converter to generate a clock signal having a frequency based on the digital signal. The pulse generating circuit further comprises a pulse generator coupled to the clock generator to generate the control signal based on the clock signal, to control the switching frequency and duty cycle of the switching regulator.

In one embodiment, the sense circuit comprises an analog-to-digital converter coupled to receive the output voltage of the switching regulator and to generate a digital signal based on the sensed increase in the output voltage. The pulse generating circuit comprises a frequency signal generator to generate a number n clock frequency signals that have frequencies that are divided by powers zero to (n−1) of two. The pulse generating circuit further comprises a pulse generator coupled to the frequency signal generator to generate a pulse frequency signal based on the clock frequency signal to control the switching frequency of the switching regulator. The pulse generating circuit further comprises a switch configured to provide a selected clock frequency signal to the pulse generator in response to the digital signal.

In one embodiment, the circuit further comprises a ramp generator and a comparator coupled to the ramp generator to provide a linear conversion of voltage to time for a fixed frequency, variable duty cycle operational mode of the switching regulator.

In one embodiment, the circuit further comprises a feedback network configured to sense the output voltage of the switching regulator. A ramp generator and a comparator are coupled to provide a linear conversion of voltage to time for a fixed frequency, variable duty cycle non-pulse skipping operational mode of the switching regulator. The comparator has a negative input coupled to the feedback network, a positive input coupled to the ramp generator to receive a ramp voltage signal, and an output. An OR gate has a first input coupled to the pulse generating circuit, a second input coupled to the output of the comparator, and an output to provide the control signal to the switch driver. The output provides a fixed frequency, variable pulse width signal under the non-pulse skipping operational mode, and a variable frequency, fixed pulse width signal under a binary pulse skipping operational mode of the switching regulator.

In another embodiment, a circuit comprises a feedback network coupled to an output of a switching regulator to generate a feedback signal in response to an output voltage of the output of the switching regulator. A ramp generator generates a ramp signal in response to a first clock signal. A comparator coupled to the feedback network and the ramp generator compares the feedback signal and the ramp signal, and in accordance therewith, generates a pulse signal of variable pulse width. A sense network coupled to the output of the switching regulator generates an overvoltage signal in response to the output voltage of the output of the switching regulator under light load conditions exceeding a threshold value under light load. A pulse generating circuit generates a pulse signal in response to the overvoltage signal. The frequency of the pulse signal is reduced in a binary manner as the sensed output voltage exceeds the threshold value. An OR gate coupled to the comparator and the pulse generating circuit generates a control signal to switch on and off a voltage input to the switching regulator in response to the comparator output or the pulse generating circuit output.

In one embodiment, the feedback network is configured to provide a feedback signal with a voltage level between lower and upper voltage limits of the ramp signal from the ramp generator, to regulate the output voltage during a first operational mode.

In one embodiment, the sense network generates an overvoltage signal indicative of the output voltage exceeding multiples of the threshold value. The frequency of the pulse signal is reduced in a binary manner corresponding to the multiples of the threshold values.

In yet another embodiment, a method comprises sensing an increase in an output voltage of a switching regulator under a light load condition; and reducing in a binary manner a switching frequency of the switching regulator under the light load condition as the sensed output voltage increases.

In one embodiment, the method further comprises generating a pulse frequency signal based on the sensed increase in the output voltage; and controlling the switching frequency of the switching regulator based on the pulse frequency signal.

In one embodiment, the method further comprises generating a pulse frequency signal comprises dividing a frequency of the pulse frequency signal by two in response to the sensed increase in the output voltage increasing above a threshold.

In one embodiment, the method further comprises generating a digital signal based on the sensed increase in the output voltage; controlling a clock frequency of a clock signal based on the digital signal; generating a pulse frequency signal based on the clock frequency; and controlling the switching frequency of the switching regulator based on the pulse frequency signal.

In one embodiment, the method further comprises providing a fixed frequency, variable duty cycle signal during a non-pulse skipping operation of the switching regulator.

In one embodiment, the method further comprises dividing a clock frequency by a plurality of multiples of two to generating a plurality of divided clock signals; generating a digital signal based on the sensed increase in the output voltage; selecting a divided clock signal based on the digital signal; and controlling the switching frequency of the switching regulator based on the selected divided clock signal under light load condition.

The following detailed description and accompanying drawings provide a better understanding of the nature and advantages of the present disclosure.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, make apparent to those of skill in the art how embodiments in accordance with the present disclosure may be practiced. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
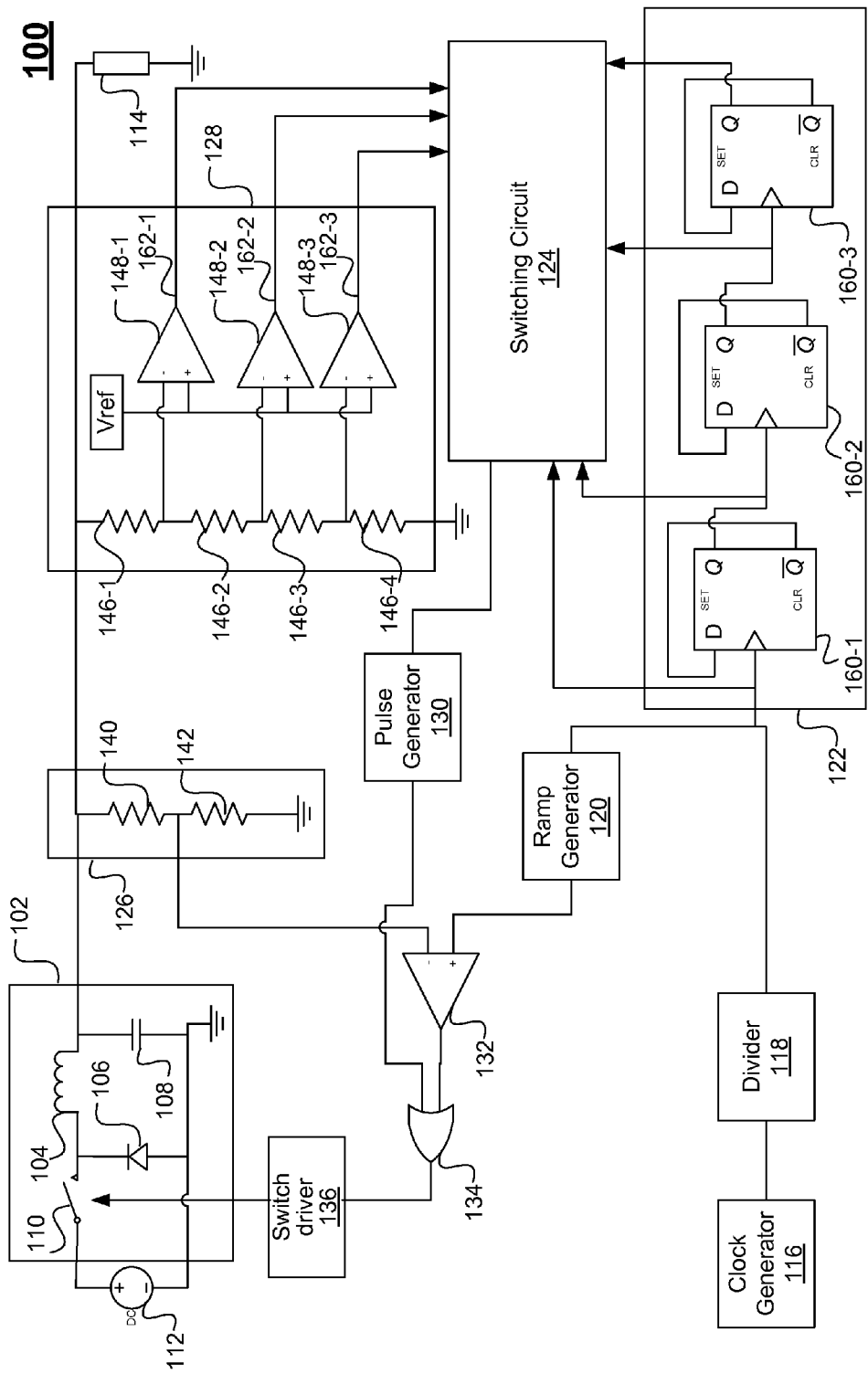
FIG. 1 illustrates a block diagram of a switch mode power supply according to an embodiment.

FIG. 1 illustrates a block diagram of a switch mode power supply 100 according to an embodiment. Switch mode power supply 100 comprises a switching regulator 102 that includes an inductor 104, a diode 106, a capacitor 108, and a switch 110. Switch 110 can be implemented as one or more transistors. Switching regulator 102 regulates the power from an input voltage source 112 that is provided to a load 114. An input voltage Vin from input voltage source 112 is coupled through switch 110 to one terminal of inductor 104 to transfer power to inductor 104. Diode 106 provides current to inductor 104 when switch 110 is open. Other common switching regulator implementations use a transistor switch instead of diode 106. Output capacitor 108 coupled to the other terminal of inductor 104 filters the output voltage. The voltage on capacitor 108 is provided to load 114.

Switch mode power supply 100 further comprises a clock generator 116, a divider 118, a ramp generator 120, a frequency divider 122, a switching circuit 124, a feedback circuit 126, a sense circuit 128, a pulse generator 130, a comparator 132, an OR gate 134, and a switch driver 136.

Clock generator 116 generates a clock signal that is provided to divider 118. In this example, clock generator 116 can be a crystal oscillator that generates a clock signal having a frequency of 19.2 MHz. Divider 118 divides the clock signal and provides the divided clock signal to ramp generator 120 and frequency divider 122. In this example, divider 118 divides the clock signal by 12 so that the divided clock signal has a frequency of 1.6 MHz.

Ramp generator 120 provides a ramp signal to a positive input of comparator 132 in response to the divided clock signal. Feedback circuit 126 provides a feedback signal to a negative input of comparator 132 in response to the output voltage of switching regulator 102. The feedback circuit 126 is configured to provide a feedback signal at a voltage level between lower and upper voltage limits of the ramp signal from ramp generator 120 to regulate the output voltage during a non-pulse skipping mode. In one embodiment, feedback circuit 126 comprises a resistor divider formed of resistors 140 and 142 serially coupled between the output of switching regulator 102 and ground. Ramp generator 120 and comparator 132 provide a linear conversion of voltage to time for a fixed frequency, variable duty cycle operational mode of the switching regulator 102. Above a limit controlled by feedback circuit 126, switch mode power supply 100 operates in a pulse skipping mode controlled by pulses from pulse generator 130. Under light load conditions (i.e., low load current), the output voltage of switching regulator 102 may increase. When an increase in the output voltage causes the negative input of comparator 132 to increase above the maximum ramp value of ramp generator 120, switch mode power supply 100 transitions into pulse mode where switching pulses are skipped to reduce the energy transferred to inductor 104 as described below.

Comparator 132 provides a control signal having pulses of fixed frequency and variable duty cycle (pulse width). The duty cycle decreases with increasing output voltage of switching regulator 102.

Sense circuit 128 provides a plurality of digital control signals 162 to switching circuit 124 in response to the level of the output voltage of switching regulator 102. In various embodiments, sense circuit 128 functions as an analog-to-digital converter that converts the value of the output voltage of switching regulator 102 into a digital value. In one embodiment, sense circuit 128 comprises a voltage divider formed of resistors 146 serially coupled between the output of switching regulator 102 and ground. In this example, the voltage divider is formed of resistors 146-1 through 146-4. Sense circuit 128 further comprises comparators 148 that have a negative input coupled to a corresponding node between resistors 146 and a positive input coupled to a reference voltage. The digital control signals 162 from comparators 148 are provided to switching circuit 124. In this example, sense circuit 128 comprises three comparators 148-1 through 148-3.

Frequency divider 122 provides a plurality of divided clock signals to switching circuit 124. In various embodiments, the divided clock signals are the divided clock signal provided by divider 118 divided in a binary manner. In this example, the divided clock signals are divided by powers of two (e.g., 2, 4, and 8). Frequency divider 122 comprises a series of cascaded D-flip flops 160. In this example, frequency divider 122 comprises D flip-flops 160-1 through 160-3. Frequency divider 122 provides divided clock signals of 800 kHz, 400 kHz, and 200 kHz in response to a 1.6 MHz divided clock signal from divider 118.

Switching circuit 124 comprises switching logic which acts as a 4-way selector switch. This provides the selected divided clock signal to pulse generator 130.

Pulse generator 130 provides a pulse signal of fixed pulse width to OR gate 134 in response to the selected divided clock signal from switching circuit 124. In this example, pulse generator 130 produces a fixed width pulse in response to the leading edge of the divided clock signal waveform from switching circuit 124. In pulse skipping mode, OR gate 134 provides the pulse signal from pulse generator 130 to switch driver 136 to control the switching frequency of opening and closing of switch 110 of switching regulator 102.

Under normal load, ramp generator 120 and comparator 132 provide pulsewidth modulation to switch driver 136 for controlling switching regulator 102. Under light load, a minimum pulse width (Pon(min)) may be initiated in which the output voltage of switching regulator 102 is allowed to rise above the voltage level limited by feedback circuit 126. As the output voltage rises, sense circuit 128 indicates the output voltage by digital control signals 162. In response, switching circuit 124 selects the divided clock signal that divides the clock signal by two (e.g., to 800 kHz) to remove every second pulse. Further increases in the output voltage cause divisions of the clock frequency by another two (by four to 400 kHz) to remove 3 of 4 pulses so that only every fourth pulse remains. If the output voltage further increases, the frequency is divided by another two (by eight to 200 k Hz) to remove 7 of 8 pulses so that every eighth pulse remains, and so forth. The frequency of the pulse signal is reduced in a binary manner corresponding to powers of two that are related to the amount by which the increased output voltage exceeds the threshold values of the sensing circuit 128.

Figure 2:
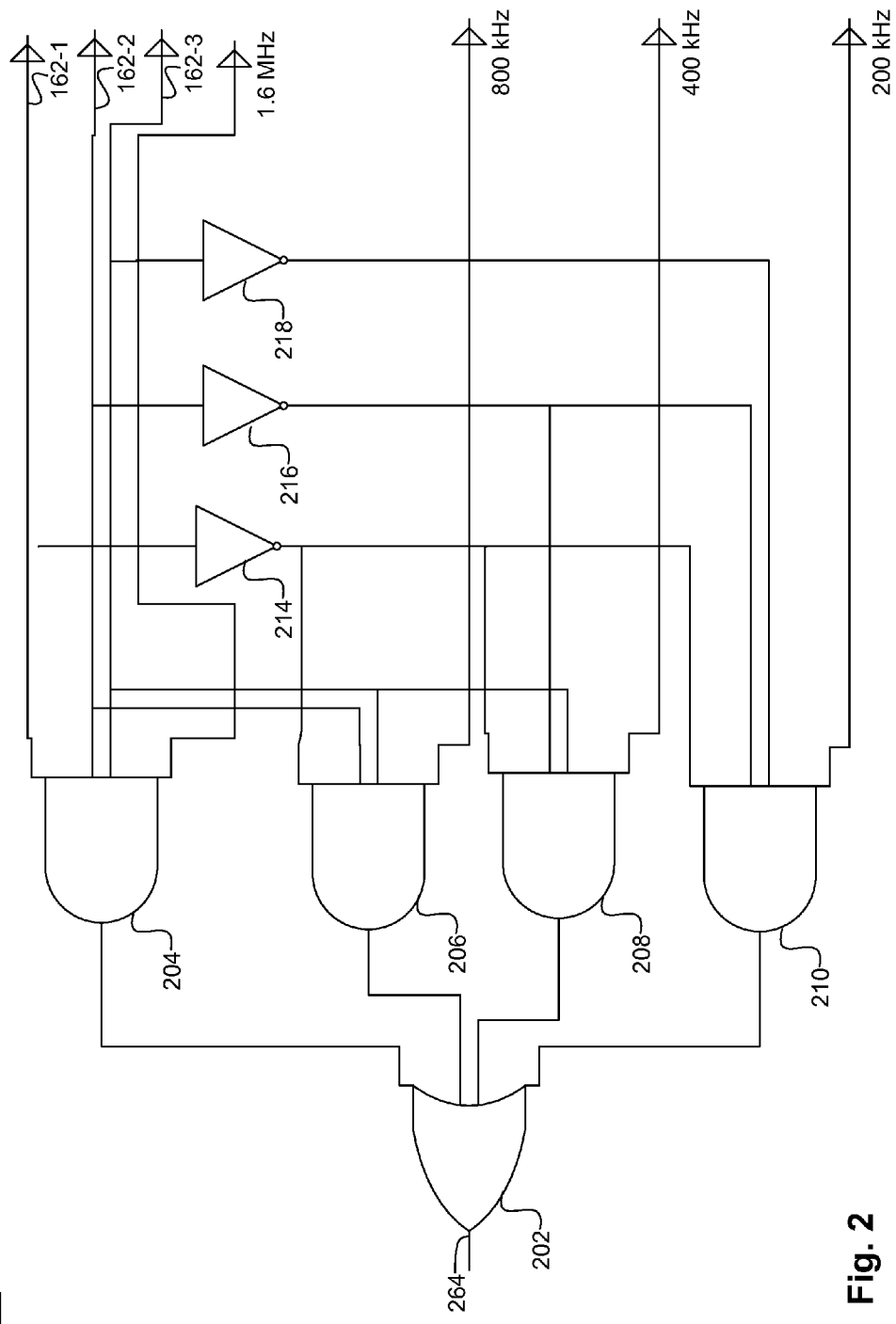
FIG. 2 illustrates a block diagram of a switching circuit according to an embodiment.

FIG. 2 illustrates a block diagram of switching circuit 124 according to an embodiment. In this example, switching circuit 124 comprises an OR gate 202, a plurality of AND gates 204, 206, 208, and 210, and a plurality of inverters 214, 216, and 218. The OR gate 202 provides a clock signal 264 that is applied to the pulse generator 130. Switching circuit 124 selects the clock signal from frequency divider 122 or divider 118, based on the digital control signals 162.

In this example, switching circuit 124 has a truth table as follows:

| Signal 162-1 | Signal 162-2 | Signal 162-3 | Clock signal 264 of OR gate 202 |
|---|---|---|---|
| 1 | 1 | 1 | 1.6 MHz |
| 0 | 1 | 1 | 800 kHz |
| 0 | 0 | 1 | 400 kHz |
| 0 | 0 | 0 | 200 kHz |

It is understood that other combinations of logic can be used for switching circuit 124.

Figure 3:
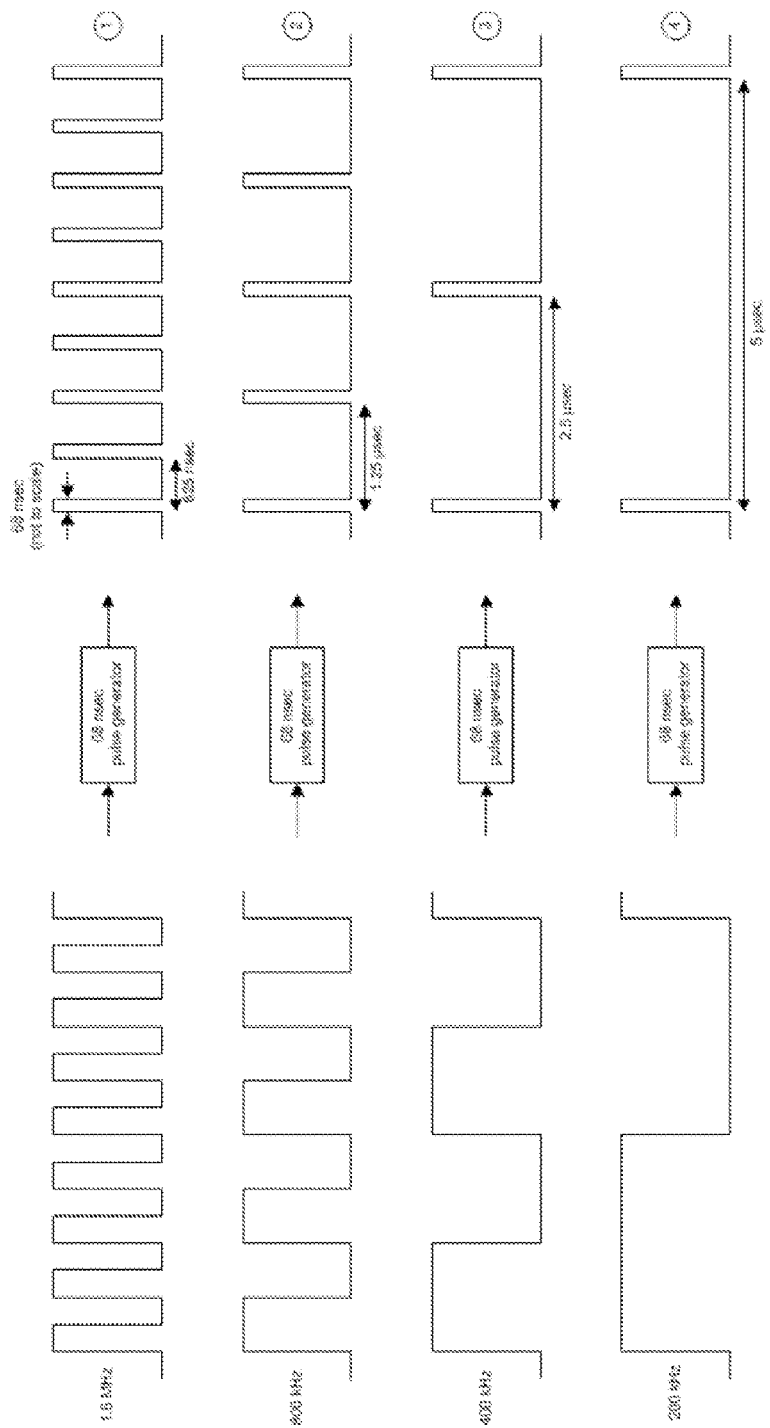
FIG. 3 illustrates timing diagrams illustrating divided clock signals according to an embodiment.

FIG. 3 illustrates timing diagrams illustrating divided clock signals according to an embodiment. In this example, the clock frequency signals are shown for the 1.6 MHz, 800 kHz, 400 kHz, and 200 kHz divided clock signals from switching circuit 124, and the resultant pulse signals generated by pulse generator 130. As the output voltage increases, pulses are effectively removed in a binary manner because the frequency of the pulses is reduced in a binary manner.

Figure 4:
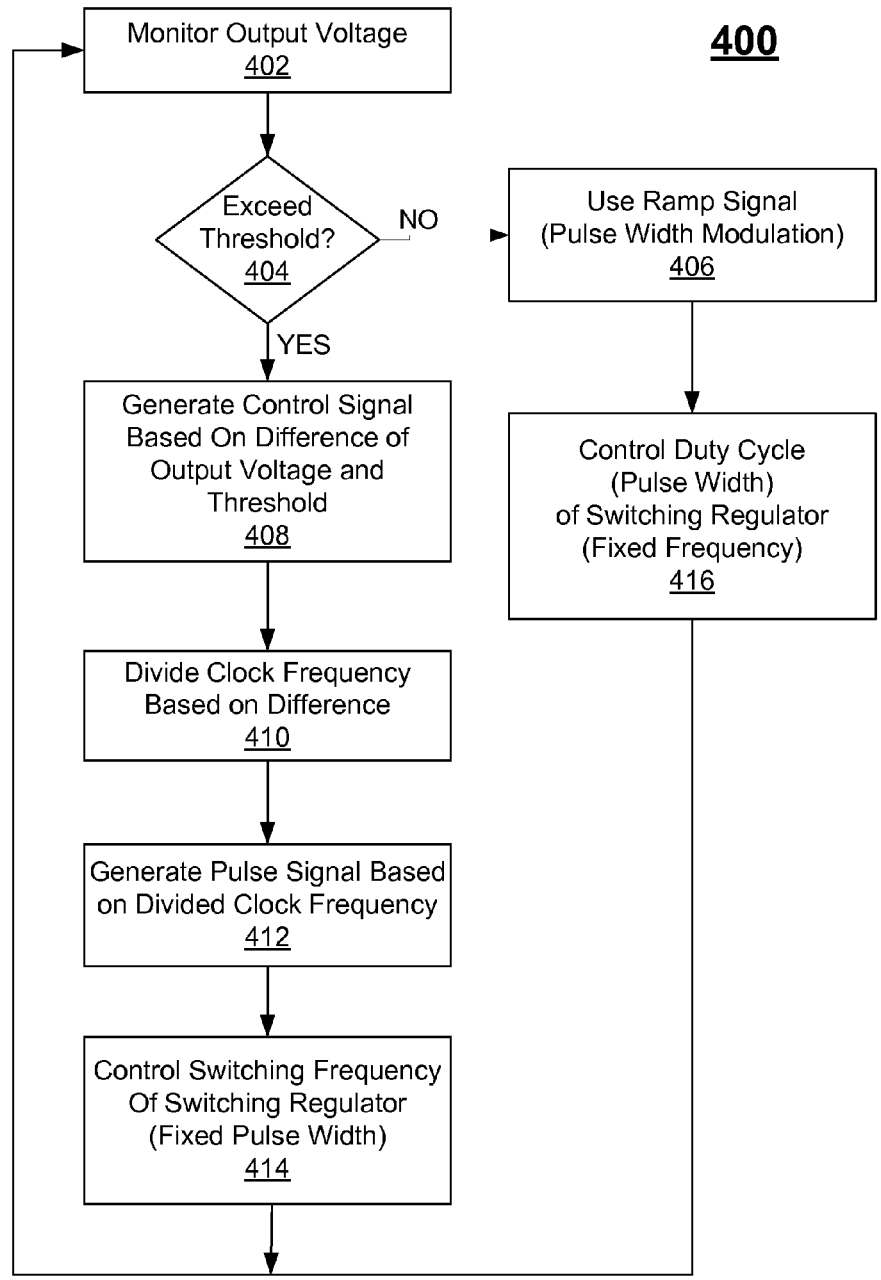
FIG. 4 illustrates a simplified diagram illustrating a process flow for controlling a switching regulator according to an embodiment.

FIG. 4 illustrates a simplified diagram illustrating a process flow 400 for controlling switching regulator 102 according to an embodiment.

At 402, sense circuit 128 monitors the output voltage of switching regulator 102. At 404, sense circuit 128 compares the output voltage to a threshold (e.g., a reference voltage Vref). If, at 404, the output voltage does not exceed the threshold, conventional pulse width modulation is implemented by, at 406, varying the slicing level applied to the output of the ramp generator 120. At 416, comparator 132 compares the slicing (voltage) level at its inverting (negative) input to the ramp signal at its non-inverting (positive) input, and, in accordance therewith, generates a fixed-frequency, variable pulse width output.

Otherwise, if, at 404, the output voltage exceeds the threshold, at 408, sense circuit 128 generates a control signal based on the difference between the output voltage and the threshold. In this example, sense circuit 128 generates digital control signals 162 based on the difference between the output voltage and the reference voltage Vref. Sense circuit 128 senses an increase in the output voltage of switching regulator 102 under a light load condition.

At 410, switching circuit 124 divides the clock frequency of the clock signal based on digital control signal 162. In some embodiments, the clock frequency is divided by reducing in a binary manner the switching frequency of switching regulator 102 under the light load condition as the sensed output voltage increases. In one embodiment, the clock frequency is divided by a power of two for each increase in the output voltage by a multiple of the threshold. In this example, switching circuit 124 selects the divided clock signal from outputs of frequency divider 122. In various embodiments, frequency divider 122 can be a programmable clock divider having a divided frequency selected by digital control signals 162. At 412, pulse generator 130 generates a pulse signal of fixed pulse width. The frequency of the pulse signal is that of the divided clock signal, from switching circuit 124, which is applied to the input of pulse generator 130. At 414, this same signal is applied via the OR gate 134 to the switch driver 136.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A circuit comprising:
   a sense circuit configured to sense an increase in an output voltage of a switching regulator under a light load condition; and
   a pulse generating circuit to generate a control signal to switch on and off a voltage input to the switching regulator, the pulse generating circuit reducing in a binary manner a switching frequency of the control signal under the light load condition as the sensed output voltage increases.

2. The circuit of claim 1 wherein the pulse generating circuit comprises:
   a clock signal generator coupled to the sense circuit to generate a clock signal based on the sensed increase in the output voltage; and
   a pulse generator coupled to the clock signal generator to generate the control signal based on the clock signal.

3. The circuit of claim 2 wherein the clock signal generator comprises a frequency divider to divide a frequency of the clock signal by two in response to the sensed increase in the output voltage being above a threshold.

4. The circuit of claim 1 wherein the frequency of the control signal being reduced in the binary manner corresponds to powers of two that are related to an amount by which the increased output voltage exceeds a pluality of threshold values.

5. The circuit of claim 1,
   wherein the sense circuit comprises an analog-to-digital converter coupled to receive the output voltage of the switching regulator and to generate a digital signal based on the sensed increase in the output voltage;
   wherein the pulse generating circuit comprises:
      a clock generator coupled to the analog-to-digital converter to generate a clock signal having a frequency based on the digital signal; and
      a pulse generator coupled to the clock generator to generate the control signal based on the clock signal, to control the switching frequency and a duty cycle of the switching regulator.

6. The circuit of claim 1, wherein the sense circuit comprises an analog-to-digital converter coupled to receive the output voltage of the switching regulator and to generate a digital signal based on the sensed increase in the output voltage; and
   wherein the pulse generating circuit comprises:
   a frequency signal generator to generate a number n clock frequency signals that have frequencies that are divided by powers zero to (n-1) of two;
   a pulse generator coupled to the frequency signal generator to generate a pulse frequency signal based on one of the number n clock frequency signals to control the switching frequency of the switching regulator; and
   a switch configured to provide a selected clock frequency signal of the number n clock frequency signals to the pulse generator as the one of the number n clock frequency signals in response to the digital signal.

7. The circuit of claim 1, further comprising a ramp generator and a comparator coupled to the ramp generator to provide a linear conversion of voltage to time for a fixed frequency, variable duty cycle operational mode of the switching regulator.

8. The circuit of claim 1, further comprising:
   a feedback network configured to sense the output voltage of the switching regulator;
   a ramp generator and a comparator coupled to the ramp generator to provide a linear conversion of voltage to time for a fixed frequency, variable duty cycle non-pulse skipping operational mode of the switching regulator, wherein the comparator has a negative input coupled to the feedback network, a positive input coupled to the ramp generator to receive a ramp voltage signal, and an output; and
   an OR gate having a first input coupled to the pulse generating circuit, a second input coupled to the output of the comparator, and an output to provide the control signal to a switch driver, wherein the output provides a fixed frequency, variable pulse width signal under the fixed frequency, variable duty cycle non-pulse skipping operational mode, and a variable frequency, fixed pulse width signal under a binary pulse skipping operational mode of the switching regulator.

9. A circuit comprising:
   a feedback network coupled to an output of a switching regulator to generate a feedback signal in response to an output voltage of the output of the switching regulator;
   a ramp generator generating a ramp signal in response to a first clock signal;
   a comparator coupled to the feedback network and the ramp generator to compare the feedback signal and the ramp signal, and in accordance therewith, to generate a first pulse signal of variable pulse width;
   a sense network coupled to the output of the switching regulator to generate an overvoltage signal in response to the output voltage of the output of the switching regulator under light load conditions exceeding a threshold value under light load;
   a pulse generating circuit to generate a second pulse signal in response to the overvoltage signal, the frequency of the second pulse signal being reduced in a binary manner as the sensed output voltage exceeds the threshold value; and
   an OR gate coupled to the comparator and the pulse generating circuit to generate a control signal to switch on and off a voltage input to the switching regulator in response to the first pulse signal or the second pulse signal.

10. The circuit of claim 9 wherein the feedback network is configured to provide the feedback signal with a voltage level between lower and upper voltage limits of the ramp signal from the ramp generator, to regulate the output voltage during a first operational mode.

11. The circuit of claim 9 wherein the sense network generates the overvoltage signal indicative of the output voltage exceeding multiples of the threshold value, wherein the frequency of the second pulse signal being reduced in a binary manner corresponds to said multiples of the threshold value.

12. A method comprising:
    sensing an increase in an output voltage of a switching regulator under a light load condition; and
    reducing in a binary manner a switching frequency of the switching regulator under the light load condition as the sensed output voltage increases.

13. The method of claim 12 further comprising:
    generating a pulse frequency signal based on the sensed increase in the output voltage; and
    controlling the switching frequency of the switching regulator based on the pulse frequency signal.

14. The method of claim 13 wherein generating a pulse frequency signal comprises dividing a frequency of the pulse frequency signal by two in response to the sensed increase in the output voltage increasing above a threshold.

15. The method of claim 12 further comprising:
generating a digital signal based on the sensed increase in the output voltage;
controlling a clock frequency of a clock signal based on the digital signal;
generating a pulse frequency signal based on the clock frequency; and
controlling the switching frequency of the switching regulator based on the pulse frequency signal.

16. The method of claim 12 further comprising:
providing a fixed frequency, variable duty cycle signal during a non-pulse skipping operation of the switching regulator.

17. The method of claim 12 further comprising:
dividing a clock frequency by a plurality of multiples of two to generate a plurality of divided clock signals;
generating a digital signal based on the sensed increase in the output voltage;
selecting a divided clock signal based on the digital signal; and
controlling the switching frequency of the switching regulator based on the selected divided clock signal under light load condition.

* * * * *